US010214381B2

(12) United States Patent
Studer et al.

(10) Patent No.: US 10,214,381 B2
(45) Date of Patent: Feb. 26, 2019

(54) ELEVATOR SYSTEM, BRAKE SYSTEM FOR AN ELEVATOR SYSTEM AND METHOD FOR CONTROLLING A BRAKE SYSTEM OF AN ELEVATOR SYSTEM

(71) Applicant: Inventio AG, Hergiswil (CH)

(72) Inventors: Christian Studer, Kriens (CH); Raphael Bitzi, Lucerne (CH)

(73) Assignee: INVENTIO AG, Hergiswil (CH)

( * ) Notice: Subject to any disclaimer, the term of this patent is extended or adjusted under 35 U.S.C. 154(b) by 83 days.

(21) Appl. No.: 15/501,453

(22) PCT Filed: Jul. 23, 2015

(86) PCT No.: PCT/EP2015/066900
§ 371 (c)(1),
(2) Date: Feb. 3, 2017

(87) PCT Pub. No.: WO2016/020204
PCT Pub. Date: Feb. 11, 2016

(65) Prior Publication Data

US 2017/0233219 A1 Aug. 17, 2017

(30) Foreign Application Priority Data

Aug. 7, 2014 (EP) .................................... 14180194

(51) Int. Cl.
*B66B 1/28* (2006.01)
*G05B 15/00* (2006.01)
*B66B 1/32* (2006.01)
*B66B 1/36* (2006.01)
*B66B 5/18* (2006.01)
*B66B 9/00* (2006.01)

(52) U.S. Cl.
CPC ................ *B66B 1/32* (2013.01); *B66B 1/365* (2013.01); *B66B 5/18* (2013.01); *B66B 9/00* (2013.01)

(58) Field of Classification Search
CPC .. B66B 1/32; B66B 1/365; B66B 5/18; B66B 9/00
USPC .......................................................... 187/247
See application file for complete search history.

(56) References Cited

U.S. PATENT DOCUMENTS 9,776,827 B2 * 10/2017 Harkonen ................ B66B 1/32
2002/0125079 A1 9/2002 Mattlar et al.
2008/0128218 A1 6/2008 Gremaud et al.
(Continued)

FOREIGN PATENT DOCUMENTS

CN 101200259 A 6/2008
CN 101588979 A 11/2009
EP 2107029 A1 10/2009

*Primary Examiner* — Jeffrey Donels
(74) *Attorney, Agent, or Firm* — William J. Clemens; Shumaker, Loop & Kendrick, LLP

(57) ABSTRACT

An elevator system includes an elevator car, at least one elevator drive arranged in an elevator shaft and a support strap, wherein the elevator car is arranged in the elevator shaft for movement via the support strap by the elevator drive. A brake system includes a car braking unit associated with the elevator car and a drive braking unit associated with the elevator drive. The car braking unit and the drive braking unit can together be controlled from a common brake control device. The brake system can be used for new elevator system installations and for retrofitting existing elevator systems.

16 Claims, 2 Drawing Sheets

(56) References Cited

U.S. PATENT DOCUMENTS

| | | | | |
|---|---|---|---|---|
| 2011/0259674 | A1* | 10/2011 | Silberhorn | B66B 5/0031 187/247 |
| 2013/0248296 | A1* | 9/2013 | Husmann | B66B 5/12 187/251 |
| 2016/0376123 | A1* | 12/2016 | Lotfi | B66D 5/30 187/250 |
| 2017/0320703 | A1* | 11/2017 | Sonnenmoser | B66B 5/0031 |
| 2018/0057309 | A1* | 3/2018 | Nikander | B66B 1/32 |

* cited by examiner

ELEVATOR SYSTEM, BRAKE SYSTEM FOR AN ELEVATOR SYSTEM AND METHOD FOR CONTROLLING A BRAKE SYSTEM OF AN ELEVATOR SYSTEM

FIELD

The invention relates to an elevator system, a brake system for an elevator system and a method for controlling a brake system of an elevator system.

BACKGROUND

Known elevator systems usually comprise a trapping system, which is designed to decelerate a free-falling elevator car and bring it to a standstill, and a drive brake, which is arranged near to an elevator drive and brakes the elevator system in operation, for example when stopping. EP2107029 discloses a corresponding brake system with a drive brake and a trapping device. The brake system has a brake control device, which initializes an appropriate braking action in the event that an abnormal condition is detected.

The drive brake system must be able to securely bring an elevator car to a stop and hold it in place in the event of a fault. For safety reasons, all parts of the drive brake system are implemented in duplicate. As a result, essential parts of the drive brake are present in duplicate, so that in case of failure of one of the drive brakes, safe braking of the elevator car is still guaranteed.

The trapping device or trapping system must be capable of braking the elevator car to a standstill and halting it in case of failure of supporting equipment or the support system in general.

Additional brakes are often also arranged on the elevator car (car brake system), which can also brake the elevator car slightly and therefore damp vibrations of the elevator car.

In some cases, car brake systems are also used which completely replace the drive brakes and which can safely temporarily halt and stop the elevator car. In this solution also, essential parts of the car brake system are implemented in duplicate. In this case, one effect of the redundancy of the brake system is to cause a weight increase of the elevator car, so that more powerful drives and more support equipment may be necessary. In other cases, overall braking power is available which is far in excess of requirements. This in turn gives rise to higher procurement and maintenance costs.

SUMMARY

An object of the present invention therefore is to provide an elevator system, a brake system for an elevator system and a method for controlling a braking unit of an elevator system of the above-mentioned type, which overall are simple and inexpensive to manufacture and maintain, are suitable both for elevator systems with a counterweight as well as for drum elevators, and can satisfy the relevant safety requirements.

This object is substantially achieved by an elevator system having a brake control device. This brake control device can actuate the car braking unit and the drive braking unit jointly when the brake is applied, so that both braking units are actuated jointly and these two braking units together produce a redundant brake system.

The proposed elevator system therefore comprises an elevator car, at least one elevator drive preferably arranged in an elevator shaft and support means, wherein the elevator car is arranged such that it can be moved in the elevator shaft by means of the elevator drive via the support means. The elevator system also includes a car braking unit, which is assigned to the elevator car, and a drive braking unit which is assigned to the elevator drive. The car braking unit and the drive braking unit are either jointly controlled or coordinated by the brake control device. This means that in each case, even in normal operation, in order to temporarily stop or hold the elevator car at a standstill, the car braking unit and the drive braking unit are actuated jointly or together.

This means that the safety-relevant redundancy can be obtained by the arrangement of the car braking unit and the drive braking unit and the coordinated or joint control of the two brakes. In case of failure of one of the brakes, the other of the two brakes continues to ensure a braking action as before.

The joint actuation can also include a temporal offset in the application of the brake. In each case, however, actuation takes place in such a way that, in the event of a breakdown or failure of one of the braking units, the other braking unit provides the entire braking power needed to safely stop or brake the elevator car. This does not require any additional control intervention, since the joint actuation has already ensured that the redundant component, or the other of the two braking units, generates its braking action. This guarantees a completely redundant dual braking safety. This is achieved by the fact that the car braking unit and the drive braking unit are always actuated at the same time or together. At the same time, the feature is also provided that between the two braking units, for example, a low response-time delay can be available, so that any resulting impact on the car is reduced.

It should be noted that both the drive braking unit and the car braking unit can each comprise a separate brake arrangement or even a plurality of brake arrangements, but these are not designed redundantly and from a safety-engineering point of view are each understood to be a single braking unit. The plurality of brake arrangements in the case of the car braking unit are used substantially to initiate the braking forces in guide rails arranged on both sides of the elevator car, or to assemble a plurality of standardized smaller brakes to form a car braking unit. In the case of the drive braking unit the primary purpose of the plurality of brake arrangements is to assemble a plurality of standardized smaller brakes to form a drive braking unit.

In addition, it is also possible for the communication between the car braking unit, the drive braking unit and the brake control device to take place via (travelling) cables in the usual way, for example via a bus system or of course also via signal cables, or it can take place via wireless means, for example radio or infrared signals. Preferably, the communication is normally designed according to principles of a “fail-safe” communication. This means that in the event of a faulty connection the braking units automatically implement a braking action. This makes the elevator system very safe.

The brake control device may also, depending on requirements, be arranged wherever desired, for example on the elevator car or in the vicinity of the drive or on a wall of the elevator shaft. The brake control device can also be integrated in or attached to an elevator control device.

Both the car braking unit and the drive braking unit are preferably designed to be fail-safe. The meaning intended here is that both braking units are actively released. In the event of a fault or a power failure, the braking units thus close automatically. A released braking unit then is a braking unit in its open position, that is to say, it does not brake in this position.

At this point it should be noted that within the context of the present invention, the word "control" is to be understood as meaning both control ("open-loop control") in its normal sense, and also regulation ("closed-loop control").

The car braking unit is preferably fixed to the elevator car and interacts with a guide rail of the elevator shaft.

The drive braking unit is preferably arranged in direct proximity to the drive of the elevator. There it preferably acts directly on a traction sheave or a drive shaft of the traction sheave. This is advantageous because it enables a force to be transmitted from the drive brake to the support means as directly as possible and a failure in the flow of force from the drive brake to the support means is minimized. In this case the drive braking unit preferably includes a plurality of individual brakes, which are distributed for example over the entire circumference of a brake disc.

An arrangement of the car braking unit on the elevator car is also advantageous because, in addition to the safe braking function, for example, the elevator car can be prevented from drifting away, or also because vibrations of the car, which occur e.g. when passengers are entering or exiting or when goods are being loaded or unloaded, can be prevented as far as possible. The car braking unit of the elevator car thus, in addition to the actual free-fall protection or its function as a trapping device, performs the function of stopping the car on a landing or slowing down the elevator car in the event of an emergency stop. The braking power in the event of an emergency stop in the case of intact support means can therefore be provided redundantly, by the joint action of the drive braking unit and the car braking unit.

More preferably, the car braking unit comprises two brakes which are arranged on respectively opposite sides of the elevator car and which each interact with a guide rail of the elevator shaft.

This ensures that the two brakes, which are arranged on the sides of the elevator car, stabilize the elevator car and prevent unwanted shifts in the position of the elevator car from occurring when braking or during a stop, which in the worst case can lead to a fault in the elevator system (e.g. due to seizing of the brake or slippage of the guide shoes of the elevator car out of the guides).

In a preferred embodiment the car braking unit can be controlled in at least two stages.

In this preferred embodiment it is ensured that the car braking unit fulfils a dual function. In the first stage, a first braking force is generated which is smaller than the second braking force that is generated in a second stage. If the car needs to be stopped, then if the support means are intact the car braking unit can be activated in the first stage and the elevator car is therefore slowed down. Only in a second phase is the second braking force then generated, e.g. to safely brake the elevator car in the event of a cable rupture or free-fall. In the event of a cable rupture, correspondingly greater braking forces are required because the weight balancing provided by the counterweight is absent. Even in the case of a prolonged stoppage on a landing, the second braking force can be activated, for example, in order to save the energy required to keep the car braking unit open.

The elevator system is preferably designed as a drum elevator system. A drum elevator system within the meaning of the present invention is understood as meaning an elevator system in which the support means are wound on a drum, as described in the book "The elevator" by Simmen/Drepper; Prestel, Munich; 1984. Alternatively or in addition, the elevator system is designed as an elevator without a counterweight. This can be implemented in one of two ways, either by means of the drum elevator, or a support means with high traction capacity can be used, so that essentially a weight of a counter-cable of the support means, together with small guide weights if necessary, is enough to drive the elevator car. A support means with high traction capacity can be a toothed belt, for example, or it may be a support means which is pressed against a traction sheave by means of a pressure contour or pinch roller, or which is clamped by means of a pre-tensioning device.

The elevator system can also be designed as a conventional traction elevator with a counterweight, however, in this case, the counterweight normally compensates for a weight of the empty elevator car plus a proportion of the permissible payload. The permissible payload is to be understood as a nominal or rated load, which means the elevator system is designed to transport this load.

This weight matching, that is to say the proportion of the permissible payload that is compensated for by the counterweight, is known as counterbalancing. If, for example, a counterbalance or a balancing factor of 50% is quoted, this means that the counterweight is equal to the weight of the empty elevator car plus 50% of the permissible payload of the elevator car. The balancing factor or the counterbalance is normally in the range between 0 and 50%. This balancing is normally performed or changed only once during the initial installation or as part of a refurbishment of the elevator system.

In accordance with the present proposed solution it is now evident that in an elevator system according to the solution, the drive braking unit can be designed to be always single-acting, i.e. from the point of view of safety-related redundancy as a single brake. The redundant braking component is provided by the car braking unit.

A brake system of this type therefore preferably contains a car braking unit, which is or can be assigned to an elevator car, and a drive braking unit, which is or can be assigned to an elevator drive. It is evident from this that the proposed brake system is suitable both for new elevator systems as well as for retrofitting in older elevator systems. The previously mentioned designs for the elevator system are of course also applicable to the brake system itself and vice-versa.

The brake system includes the car braking unit, the drive braking unit, the brake control device and corresponding communication interfaces. The car braking unit, as already explained above, can preferably be controlled or regulated in two or more stages. This means that in the normal case the car braking system can be operated with a smaller brake force, and the entire braking force is only applied in free-fall.

The car braking unit and the drive braking unit are preferably constructed differently. This means that the car braking unit and the drive braking unit each comprise brakes of a different type and design. This increases the safety of the brake system in the event of constructional or technical failure of one of the braking units, since the probability of a failure of the remaining, still intact, braking unit is lower if the braking unit is constructed differently from the braking unit that has failed. Typically, the drive braking unit is designed as a disc brake and the car braking unit as a clasp brake. Both brakes are preferably operated electro-mechanically, for example by means of electromagnets.

In accordance with the solution, a method for controlling a brake system of an elevator system is also provided. The elevator system is preferably an elevator system as described above. The advantages of the elevator system mentioned are also applicable to the method according to the invention.

The brake system of the elevator system comprises one braking unit assigned to an elevator car and one drive braking unit assigned to an elevator drive.

The car braking unit is preferably controlled in two stages. In a first step, a first braking force equal to the braking force generated by the drive braking unit is delivered. In a second step, the car braking unit generates a full second braking force.

In a cost-effective design, when an emergency stop is triggered the car braking unit and the drive braking unit are always controlled to deliver the full braking force. This enables a simple brake control, since in the event of an emergency signal, e.g. breaking of a safety circuit, the full braking power is always provided. If a brake does not function as expected, the other of the two brakes remains in a position to stop the elevator car safely.

In the event of an emergency stop it can generally be assumed that the support means are intact. As a result, both the car braking unit and the drive braking unit are controlled to deliver the full braking force. In a different design, the car braking unit can also only be controlled in a first braking stage. In this case it only outputs a proportion of the possible braking force. Thus, for example, the elevator car is not stopped abruptly, which is advantageous for passengers and/or any goods located therein.

In the case of a car braking unit which is divided into two brakes arranged on either side of the car, this can be of further advantage, since in the event of a possible malfunctioning of one of these two brakes an asymmetrical braking force is smaller.

In a cost-effective variant, when a free-fall of the elevator car is detected the car braking unit and the drive braking unit are controlled to deliver the full braking force. Alternatively, when a free-fall is detected it is possible for the car braking unit alone to be activated. This can of course also be actuated or regulated in stages, so that even in this exceptional case a gentle braking can be effected overall.

In addition, known methods for monitoring the function of the brake system may be used. Thus, for example, during a stop the drive braking unit or the car braking unit can be opened briefly or in advance, and a control device can then check the extent to which the remaining braking unit is capable of keeping the elevator car stationary. In another example, the braking units can be controlled in such a way that in the event of a brake command, one of the two braking units comes into effect first and then, for example after a short period of time, the other of the two braking units is also applied for braking. During the short period of time, the control unit can check the extent to which one braking unit can deliver sufficient braking power.

DESCRIPTION OF THE DRAWINGS

The invention will now be explained more clearly by reference to the drawings. Shown are.

DETAILED DESCRIPTION

Figure 1:
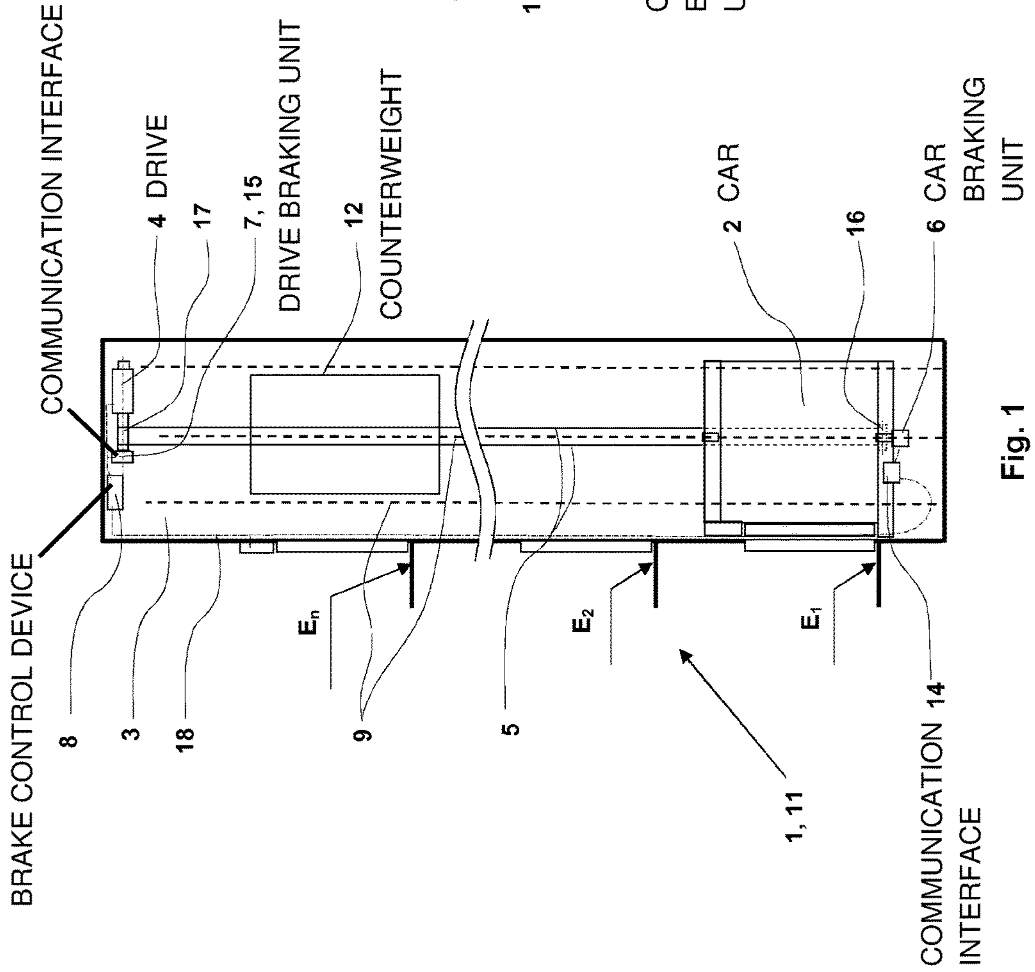
FIG. 1 is a schematic side view of an elevator shaft of a first embodiment of the invention.

In FIG. 1 a schematic view of an elevator shaft 3 of an elevator system 1 is shown. The elevator system 1 comprises an elevator car 2, which is located on a landing $E_1$. Further landings of the elevator shaft 3 are represented as $E_2$ to $E_n$. The elevator system 1 of FIG. 1 is designed as a traction elevator system 11 with a counterweight 12, wherein the support means 5 are designed as support straps and are routed under the elevator car 2 and around a traction sheave 17.

In the elevator shaft 3 guide rails 9 for the elevator car 2 and the counterweight 12 are also located, which are used to guide and stabilize the elevator car 2 or counterweight 12 respectively. The elevator car 2 is equipped with a car braking unit 6, which is located under the elevator car 2.

Figure 2:
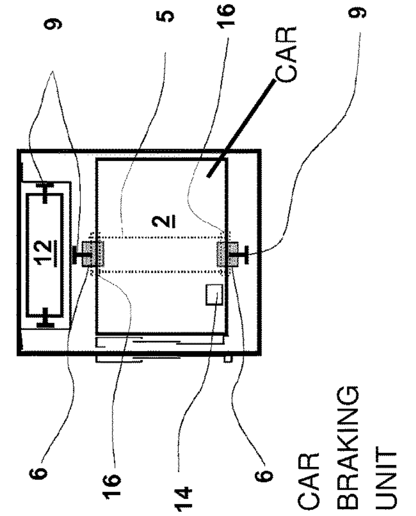
FIG. 2 is a schematic sectional view through the elevator shaft of FIG. 1.

FIG. 2 shows a schematic view of the elevator system 1 from above. The guide rails 9, which in each case guide the elevator car 2 and the counterweight 12 in pairs, are clearly visible.

The car braking unit 6 of the elevator car 2 consists of two brakes, which are arranged underneath the elevator car 2 and to the side, near to deflection pulleys 16 of the support means 5. Suitable devices for the car braking units 6 are primarily electrically actuated brakes. These can be, for example, magnetically releasable clasp brakes, hydraulic-caliper brakes, or else multi-stage controllable brakes, as is known, for example, from document EP 1930282.

Both brakes of the car braking unit 6 interact with one guide rail 9 each to brake the elevator car 2, and also serve as a trapping device. No separate trapping device is provided.

In the region of the drive the elevator system 1 is also equipped with a drive braking unit 7, which directly interacts with the elevator drive 4 and the traction sheave 17. The elevator drive 4 can be a geared drive or also a gearless machine. The drive braking unit 7 can be designed as a disc brake, preferably a spring-force brake, a drum brake or other type of design.

Both the car braking unit 6 and the drive braking unit 7 are connected to a common brake control device 8 and to each other via a connection cable 18, shown schematically with a dash-dotted line, and respective communication interfaces 14 and 15.

In this exemplary embodiment the brake control device 8 is arranged in the elevator shaft 3 and integrated in a control device, which also performs the control of the entire elevator system 1. Naturally, the brake control device 8, in particular if it is a brake system which is intended for retrofitting in already existing elevator systems, can be designed as a separate unit.

The brake control device 8 can, depending on the specific application, also be arranged on the elevator car 2, however.

Figure 3:
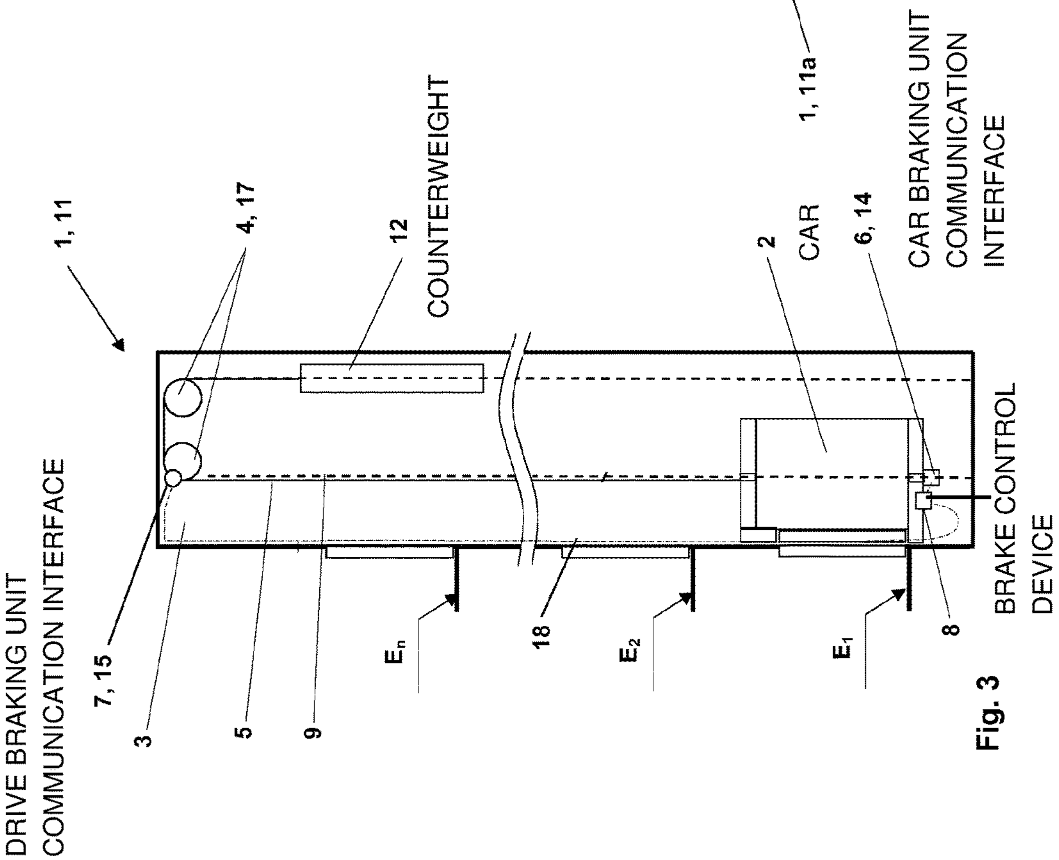
FIG. 3 is a schematic side view of an elevator shaft of a second embodiment of the invention.

In FIG. 3 a second preferred embodiment of an elevator system 1 according to the invention is shown. Identical reference numerals indicate identical or equivalent parts, which have already been described above in relation to FIGS. 1 and 2.

The elevator system 1 is designed as a traction elevator system 11 with a counterweight 12. The counterweight 12 in this exemplary embodiment—viewed from the landing $E_1$ to $E_n$—is arranged behind the car 2. The car 2 and the counterweight 12 are in turn supported by a support means 5, which is guided and driven via a traction sheave arrangement 17 of the elevator drive 4.

The brake control device 8 is arranged on the elevator car 2. The car or drive braking unit 6, 7 is designed with an integrated communication interface 14, 15 respectively and connected via a connecting cable 18 to the brake control device 8.

Figure 4:
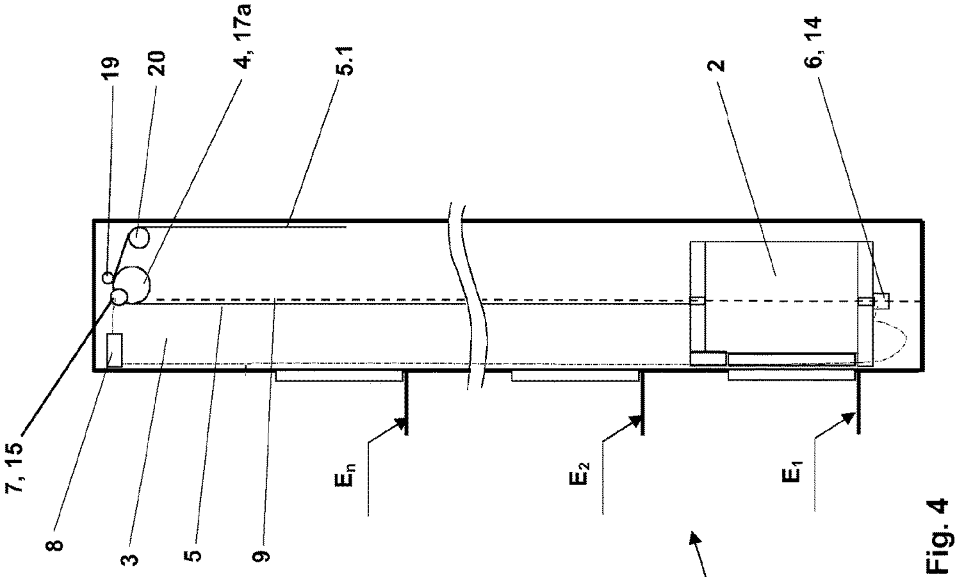
FIG. 4 is a schematic side view of an elevator shaft of a further embodiment of the invention.

In FIG. 4 a further alternative embodiment of an elevator system 1 is shown. Identical reference numerals again indicate identical or equivalent parts, which have already been described above in relation to FIGS. 1 and 3.

The elevator system 1 is designed a counterweight-free traction elevator 11*a*. The car 2 is again supported by a support means 5. This support means 5 is guided and driven via a traction sheave arrangement 17*a* of the elevator drive 4. The support means 5 is routed on the opposite side—on the side occupied previously by the counterweight—loosely in the elevator shaft 3 using a substantially free strand 5.1. If necessary, a small tension weight is attached, which is only used for holding the strand 5.1 tight, however, and for guiding the same if necessary. A transmission of traction from the traction sheave arrangement 17*a* to the support means 5 is ensured by means of a pressure roller 19, which presses the support means 5 onto the traction sheave arrangement 17*a*. In addition, a deflection pulley 20 is provided, which steers the support means 5 back into the elevator shaft 3.

Alternatively, the traction sheave arrangement 17*a* in accordance with the present exemplary embodiment can be replaced by a drum drive. In this case the support means is coiled up, in a drum, for example. The strand 5.1 freely suspended in the elevator shaft is then omitted.

The brake control device 8 in this exemplary embodiment is preferably again arranged in the elevator shaft 3. In the case of a counterweight-free elevator system 11*a* there is a need to keep the elevator car 2 as light as possible, since its empty weight is clearly not compensated. The arrangement of the brake control device 8 in the elevator shaft 3 takes this appropriately into account. The car braking unit 6 with the corresponding communication interface 14 is located on the elevator car 2. In a simple design, the communication interface 14 includes on the one hand the power supply for an electromagnet of the car braking unit 6 in order to hold this in its open condition, and also includes a position signal from the car braking unit 6, which indicates whether the car braking unit 6 is in its open or closed position. In a more complex design, other parameters such as wear condition, temperature, other position settings, etc. can of course also be communicated. This type of arrangement and design of the communication interface 14 can also be used in the other exemplary embodiments. The drive unit 4 accordingly includes the drive braking unit 7 with the associated communication interface 15. The communication interface 15 of the drive braking unit 7 is designed in exactly the same way as the previously described communication interface 14 of the car braking unit 6.

Hereafter, an elevator system 1 according to the invention is compared with an elevator system according to the prior art. In this comparison, constant reference will be made to an elevator system 1 with a mass of the elevator car 2=K; a mass of the support means 5 (plus any cable masses)=S and a rated load=F.

In the case of an elevator 11*a* without a counterweight, such as a drum elevator system or a traction elevator as previously described, two drive braking units are provided in accordance with the prior art, each of which must generate a brake force $F_{AB}$>(K+F+S)*g. This means that the elevator car can be safely stopped or braked with the required redundancy. In addition a trapping device is present, which also generates a brake force $F_{FV}$>(K+F+S)*g. By means of the trapping device the elevator car can be stopped independently of the drive in the event of failure of the support means. Of course, in calculating the brake force, excess factors are applied to the design of the brake system in order to guarantee safe functioning over a longer period of time.

It is apparent therefore that in this case, more than three times the braking force is provided. This means that, for example if all three brake systems respond at the same time, a very large deceleration of the elevator car can occur.

In accordance with one aspect of the solution it is then proposed to design the drive braking unit 7 for generating a single brake force $F_{AB}$>(K+F+S)*g, while at the same time the car braking unit 6 can produce a braking force $F_{KB}$ of the same order of magnitude>(K+F+S)*g. The total braking force $F_{AB}+F_{KB}$ that can be generated is therefore lower than in an elevator system according to the prior art, since in total only about twice the braking force is available. The overall safety of the elevator system is maintained, because the car braking unit 6 is activated together or jointly with the drive braking unit 7.

The operation 'greater than' (>) is to be understood to mean that a corresponding excess factor is applied. Based on experience, this factor is approximately 20%-50% (factor of 1.2-1.5), wherein for precisely known load conditions the lower excess factor is aimed for.

In the case of a traction elevator system 11 with a counterweight 12 having a mass=KA*F+K+S (the factor KA corresponds to the percentage of the rated load which is compensated or counterbalanced by the counterweight), the two drive braking units must each be able to generate a braking force $F_{AB}$>((1−KA)*F)*g. In the case of 50% counterbalancing it must therefore be the case that $F_{AB}$>((1−0.5)*F)*g and with a 30% counterbalance, $F_{AB}$>((1−0.3)*F)*g. In addition, the trapping device is designed to provide a braking force $F_{FV}$>(K+F+S)*g. In addition, brake force excess factors are applied in the calculation of the brake system in order to guarantee safe functioning over a longer period of time. It turns out, therefore, that an excessive braking force is also available in this case.

The above formulas for the design of the braking force $F_{AB}$ apply for a counterbalance KA in the range of 0 to 50%. A counterbalance above this range is irrelevant in practice, or not applied.

In accordance with one aspect of the solution it is then proposed to design the drive braking unit 7 for generating a single brake force $F_{AB}$>((1−KA)*F)*g, while the car braking unit 6 can continue to generate a braking force $F_{KB}$>(K+F+S)*g. The total generatable braking force $F_{AB}+F_{KB}$ is therefore lower than in an elevator system according to the prior art.

It is therefore possible to save costs, since the redundancy within the drive braking unit itself is not necessary. In addition, weight savings are therefore possible, which enable more cost-effective and energy-efficient drives to be installed.

Instead of the elevator system 1 of FIGS. 1 to 4 being a new installation, a brake system according to the invention comprising a car braking unit 6 with associated communication interface 14, a drive braking unit 7 with associated communication interface 15 and a brake control device 8 can be retrofitted in already existing elevator systems 1.

In accordance with the provisions of the patent statutes, the present invention has been described in what is considered to represent its preferred embodiment. However, it should be noted that the invention can be practiced otherwise than as specifically illustrated and described without departing from its spirit or scope.

The invention claimed is:

1. An elevator system including an elevator car, an elevator drive and a support means, wherein the elevator car is moved in an elevator shaft by the elevator drive via the support means, comprising:

a car braking unit for braking the elevator car;

a drive braking unit for braking the elevator drive; and a brake control unit for controlling the car braking unit and the drive braking unit, wherein the brake control unit controls the car braking unit and the drive braking unit for joint actuation so that the car braking unit and the drive braking unit are actuated jointly and together as a redundantly operating brake system.

2. The elevator system according to claim 1 wherein the car braking unit is fixed to the elevator car and interacts with at least one guide rail of the elevator shaft.

3. The elevator system according to claim 2 wherein the car braking unit comprises two brakes, which brakes are arranged on respectively opposite sides of the elevator car and which brakes each interact with a guide rail of the elevator shaft.

4. The elevator system according to claim 1 wherein the brake control unit actuates the car braking unit in at least two stages of braking.

5. The elevator system according to claim 1 wherein the elevator system is a traction elevator system without a counterweight or a drum elevator system.

6. The elevator system according to claim 5 wherein the drive braking unit and the car braking unit are each, independently of each other, operable to generate a braking force which is a sum of a weight of the elevator car empty, a weight of a permissible payload and a weight of additional masses including the support means, where the braking force is sufficient to safely decelerate the elevator car loaded with the permissible payload.

7. The elevator system according to claim 1 wherein the elevator system is a traction elevator system with a counterweight supported by the support means.

8. The elevator system according to claim 7 wherein the drive braking unit is operable to generate a drive braking force defined by a counterbalancing by the counterweight in relation to a weight of a permissible payload, and the car braking unit is operable to generate a car braking force defined by a sum of a weight of the empty elevator car, the weight of the permissible payload and a weight of additional masses including the support means, where the drive braking force and the car braking force are each sufficient to safely decelerate the elevator car loaded with the permissible payload.

9. The elevator system according to claim 7 wherein the drive braking unit is operable to generate a drive braking force defined by a counterbalancing by the counterweight in relation to a weight of a permissible payload, and the car braking unit, in a first braking stage, is operable to generate a first car braking force defined by the counterbalancing in relation to the weight of the permissible payload, and the car braking unit is operable to generate a second car braking force that is a sum of the weight of the empty elevator car, the weight of the permissible payload and a weight of additional masses including the support means, where the drive braking force and the first and second car braking forces are each sufficient to safely decelerate the elevator car loaded with the permissible payload.

10. A brake system for an elevator system, the elevator system including an elevator car movable by an elevator drive, comprising:

a car braking unit for braking the elevator car;

a drive braking unit for braking the elevator drive; and a brake control unit connected via at least one communication interface to the car braking unit and to the drive braking unit, the brake control unit jointly controlling the car braking unit and the drive braking unit for joint actuation to operate as a redundantly operating brake system.

11. The brake system according to claim 10 wherein the car braking unit and the drive braking unit are of different construction.

12. A method for controlling a brake system of an elevator system, the elevator system including a car braking unit for braking an elevator car and a drive braking unit for braking an elevator drive, comprising the steps of:

providing a brake control unit in communication with the car braking unit and the drive braking unit; and operating the brake control unit to jointly control the car braking unit and the drive braking unit so that the car braking unit and the drive braking unit are actuated jointly and together as a redundantly operating brake system.

13. The method according to claim 12 including operating the brake control unit to control the car braking unit in a first step to generate a first braking force equal to a braking force generated by the drive braking unit.

14. The method according to claim 13 including operating the brake control unit to control the car braking unit in a second step to generate a second braking force greater than the first braking force.

15. The method according to claim 12 wherein the brake control unit, in response to an emergency stop being triggered, controls the car braking unit and the drive braking unit to generate together a full braking force.

16. The method according to claim 15 wherein the brake control unit, in response to detection of a free-fall of the elevator car, controls at least the car braking unit to generate the full braking force.

* * * * *